United States Patent [19]

Rao et al.

[11] Patent Number: 5,286,578
[45] Date of Patent: Feb. 15, 1994

[54] COLLAPSIBLE ELECTROCHEMICAL CELL ASSEMBLY AND BATTERY ASSEMBLY COMPRISED OF A PLURALITY OF COLLAPSIBLE ELECTROCHEMICAL CELLS

[75] Inventors: Bhaskara M. L. Rao, Flemington; William Kobasz, Edison, both of N.J.

[73] Assignee: Alupower, Inc., Flemington, N.J.

[21] Appl. No.: 922,158

[22] Filed: Jul. 30, 1992

[51] Int. Cl.$^5$ .......................................... H01M 12/06
[52] U.S. Cl. ........................................ 429/28; 429/127; 429/153
[58] Field of Search ............... 429/66, 127, 153, 154, 429/158, 27, 28

[56] References Cited

U.S. PATENT DOCUMENTS

| | | | |
|---|---|---|---|
| 395,028 | 12/1888 | Bailey et al. | 429/127 |
| 2,966,538 | 12/1960 | Bernot | 429/154 X |
| 3,594,234 | 7/1971 | Lang et al. | 429/28 |
| 3,607,401 | 9/1971 | Halpert et al. | 429/127 X |
| 4,374,186 | 2/1983 | McCartney et al. | 429/154 |

*Primary Examiner*—Stephen Kalafut
*Attorney, Agent, or Firm*—Louis E. Marn

[57] ABSTRACT

There is described an electrochemical cell comprised of at least one flexible side wall attached to another side wall forming an electrolyte chamber and wherein one side wall is formed or provided with an air cathode mounted in spaced apart relationship to a metallic anode by a dielectric member and wherein battery assemblies may be produced by mounting a plurality of such electrochemical cells to each by support members with desired series or parallel electrical circuitry as required for intended duty.

14 Claims, 2 Drawing Sheets

COLLAPSIBLE ELECTROCHEMICAL CELL ASSEMBLY AND BATTERY ASSEMBLY COMPRISED OF A PLURALITY OF COLLAPSIBLE ELECTROCHEMICAL CELLS

BACKGROUND OF THE INVENTION

1. Field of the Invention

This invention relates to cell assemblies, and more particularly to a collapsible electrochemical cell assembly and process for assembling an electrochemical battery assembly from a kit of collapsible electrochemical cells comprised of air cathodes and metal anodes.

2. Description of the Prior Art

Metal/air batteries produce electricity by electrochemically coupling in a cell a reactive metallic anode to an air cathode through a suitable electrolyte. As is well known in the art, an air cathode is typically a sheet-like member having opposite surfaces respectively exposed to the atmosphere and to an aqueous electrolyte of the cell, in which (during cell operation) atmospheric oxygen dissociates while metal of the anode oxidizes providing a usable electric current flow through external circuitry connected between the anode and the cathode. The air cathode must be permeable to air, but substantially hydrophobic (so that an aqueous electrolyte will not seep or leak through it), and must incorporate an electrically-conductive element for external circuitry.

In U.S. Pat. No. 4,626,482 to Hamlen et al. and assigned to the same assignee as the present invention, there is disclosed a metal/air battery having a plurality of series-connected cells including a tank for holding a body of liquid electrolyte. In U.S. Pat. No. 4,745,529 also to Hamlen et al. and assigned to the same assignee as the present invention, there is disclosed a battery-powered light source comprising an electric light bulb, pairs of metal/air electrodes wherein each metal/air electrode pair is enclosed in a chamber of a housing for subsequent receipt of an electrolyte.

In both such systems, the cell and/or battery tanks and/or housings are a fixed structure for the liquid electrolyte and thus are rigid with the dry storage volume and electrolyte fill volumes remaining substantially the same. Consequently, the storage and shipment of such rigid battery tanks and/or housing are of an excess volume as a result of the fixed volume thereof.

OBJECTS OF THE INVENTION

An object of the present invention is to provide a collapsible electrochemical cell assembly.

Another object of the present invention is to provide a collapsible electrochemical cell assembly expandable to predetermined volumes for liquid electrolyte addition.

A further object of the present invention is to provide a collapsible electrochemical cell assembly of convenient carrying size and weight.

Yet another object of the present invention is to provide an electrochemical battery assembly comprised of collapsible cell members which is facilely assembled into an operative electrochemical battery.

Yet still another object of the present invention is to provide a collapsible electrochemical battery assembly which may be readily assembled and disassembled for subsequent further reuse.

A still further object of the present invention is to provide a collapsible electrochemical battery assembly of reduced storage volume.

SUMMARY OF THE INVENTION

These and other objects of the present invention are achieved by an electrochemical cell comprised of at least one flexible side wall attached to another side wall forming an electrolyte chamber and wherein one side wall is formed or provided with an air cathode mounted in spaced apart relationship to a metallic anode by a dielectric member and wherein battery assemblies may be produced by mounting a plurality of such electrochemical cells to each by support members with desired series or parallel electrical circuitry as required for intended duty.

BRIEF DESCRIPTION OF THE DRAWINGS

Further objects and advantages of the present invention will become apparent from the following detailed description when taken with the accompanying drawings wherein.

DETAILED DESCRIPTION OF THE INVENTION

Figure 1:
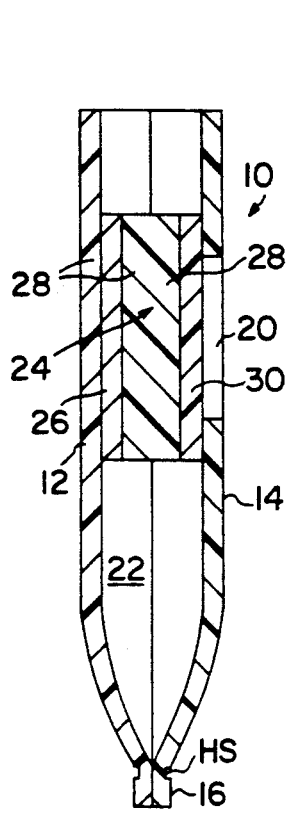
FIG. 1 is a somewhat exaggerated schematic cross-sectional elevational view of a cell for a collapsible battery assembly of the present invention.
Figure 2:
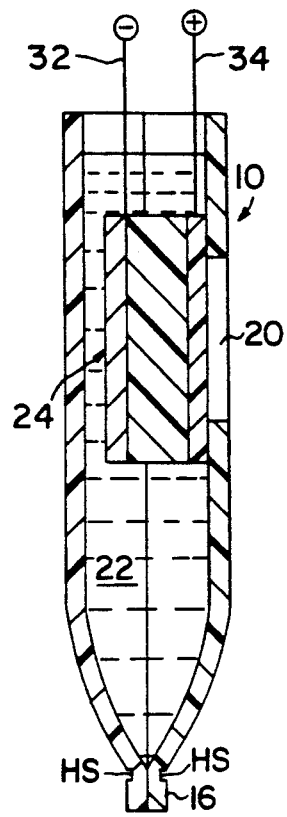
FIG. 2 is a cross-sectional view of the cell of FIG. 1 including electrolyte.
Figure 3:
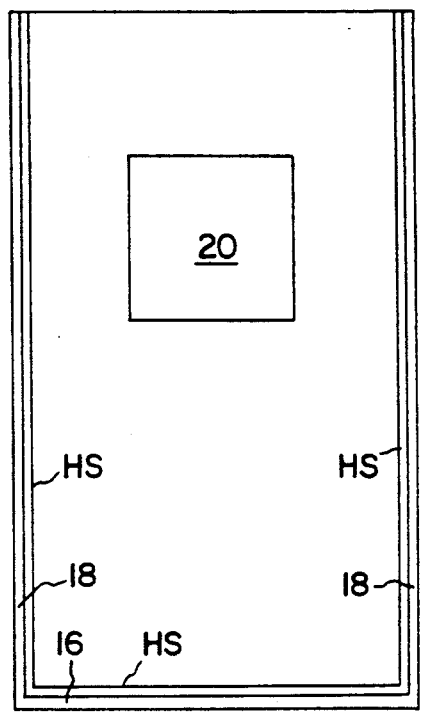
FIG. 3 is a right-side view of the cell of FIGS. 1 and 2.

Referring now to the drawings and particularly FIGS. 1, 2 and 3, there is illustrated a cell assembly, generally indicated as 10, to be included in the battery assembly of the present invention, as more fully hereinafter described. The cell 10 is comprised of side wall members 12 and 14 formed of a flexible plastic material of a thickness of from 5 to 10 mils exhibiting required properties of strength and inertness to electrolytes, such as commercially-available vinyl films. The side walls 12 and 14 are heat sealed (HS) together about the bottom and side portions 16 and 18, respectively, as more particularly illustrated in FIG. 3 utilizing known heat sealing techniques, such as adhesive bonding, heat sealing after applying a film of heat sealing adhesive or the like. The side wall 14 is formed with a square-shaped opening 20.

Within a chamber 22 formed by the side walls 12 and 14, there is provided a bi-polar electrode assembly, generally indicated as 24, comprised of an electronegative plate member 26, an intermediate porous plastic dielectric member 28 and an air cathode member 30. The air cathode 30 is mounted to the side wall 14 to cover the opening 20 in a liquid tight manner with the hydrophobic layer of the air cathode 30 facing outwardly towards the atmosphere. The air cathode member 30 is formed in accordance with the process and disclosure set forth in U.S. Pat. No. 4,906,535 to Hoge and assigned to the same assignee as the present invention hereby incorporated by reference.

The electronegative plate member or anode 26 may be formed of a suitable anodic material, such as aluminum, magnesium and mixtures thereof. The electrochemical plate member 26 is spaced apart in paralleled relationship to the air cathode 30 by the intermediate electrically non-conductive spacer 28 to allow for an anode-cathode gap required for the electrolyte. The electronegative member 26 is connected to a conductor 32 with the currect collecting member of the air cathode 30 being connected to a conductor 34.

Figures 4, 5:
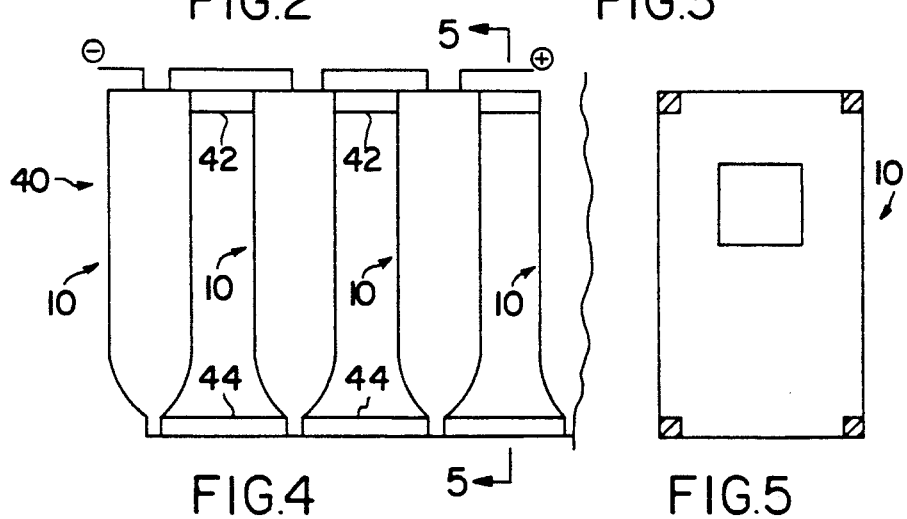
FIG. 4 is a schematic view of a plurality of cells of FIG. 1 forming the battery assembly of the present invention.
FIG. 5 is a schematic cross-sectional view taken along the lines 4—4 of FIG. 4.

A battery assembly, generally indicated as 40, referring now to FIG. 4, is comprised of a plurality of collapsible electrochemical cell members 10 spaced apart and affixed to one another by upper and lower rigid bar member 42 and 44 in requisite number as a function of predetermined voltage and wattage requirements. As illustrated in FIG. 4, the cell assemblies 10 are connected in electrical series configuration; however, may be readily configured in parallel electrical configuration. After assemblage of a plurality of cells 10 into a desired battery configuration, a suitable electrolyte is introduced into each chamber 22 of each cell 10.

Figure 6:
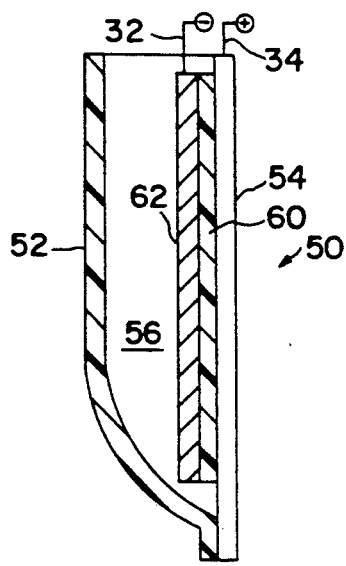
FIG. 6 is a somewhat exaggerated cross-sectional elevational view of another embodiment of a cell for a collapsible battery assembly of the present invention.
Figure 7:
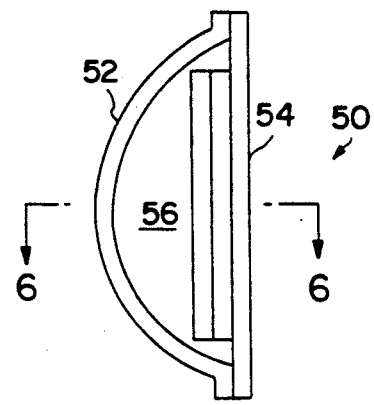
FIG. 7 is a top view of the cell of FIG. 6.
Figure 8:
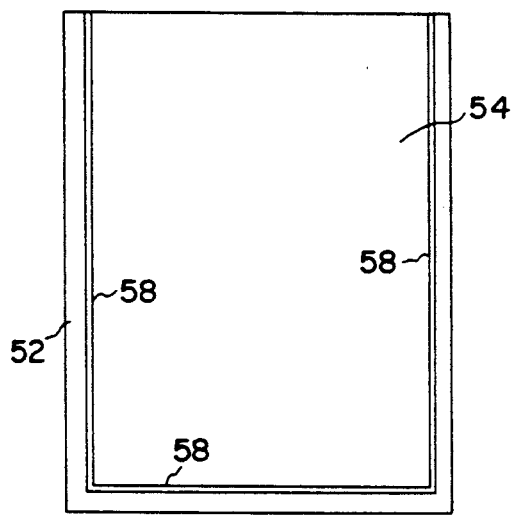
FIG. 8 is a side view of the cell of FIGS. 6 and 7.

Another cell assembly, generally indicated as 50, is illustrated in FIGS. 6 to 8, and is comprised of side wall members 52 and 54 forming a chamber 56. The side wall member 52 is similarly formed of a flexible plastic material as side walls 12 and 14 of the cell assembly of FIGS. 1 to 3. The side wall 54 is in the form of an air cathode substrate on film, such as hereinabove described, with reference to the air cathode 30 of the embodiment of FIGS. 1 to 3 with the hydrophobic layer thereof being disposed outwardly away from the chamber 56. The side wall 12 is heat sealed or adhesively fixed at 58 to the side wall 14 as hereinabove described. On the side wall 14, there is positioned an intermediate porous plastic dielectric member 60 and an electronegative plate or anode member 62, as similarly discussed with reference to the cell assembly 10 of FIGS. 1 to 3.

Figure 9:
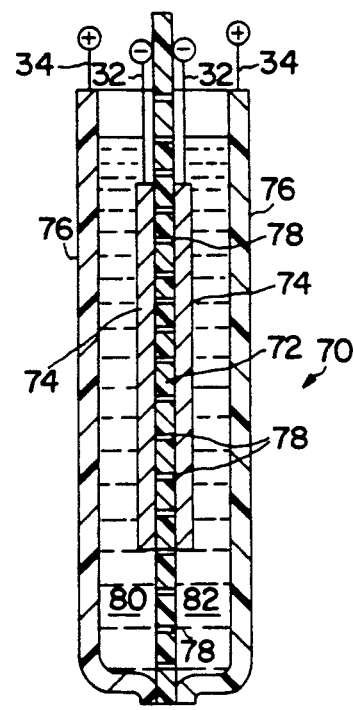
FIG. 9 is a cross-sectional elevational view of still another embodiment of a collapsible battery assembly comprised of paired electrochemical cells.

Still another embodiment of an electrochemical cell in a battery assembly, generally indicated as 70, is illustrated in FIG. 9, and is of a pair configuration, such as described in the aforementioned U.S. Pat. No. 4,626,482 to Hamlen et al. The battery assembly 70 is comprised of an intermediate support member 72 having electronegative or anode plate or member 74 mounted to either side thereof with outer side walls 76 affixed to the intermediate support member 72. The intermediate support member 72 is formed of a dielectric plastic material and is provided with orifices 78 to provide for fluid communication between chambers 80 and 82 formed between the side walls 76 with the intermediate support member 72.

The electronegative layers 74 formed of an anodic material, such as described with reference to the anodic material of FIGS. 1 to 3. The flexible side wall members 76 are of an air cathode substrate or layer film, such as disclosed in the aforementioned U.S. letters patent to Hoge et al. with the hydrophobic layer being the component of each side wall (extending outwardly) as would be understood by one skilled in the art.

Figure 10:
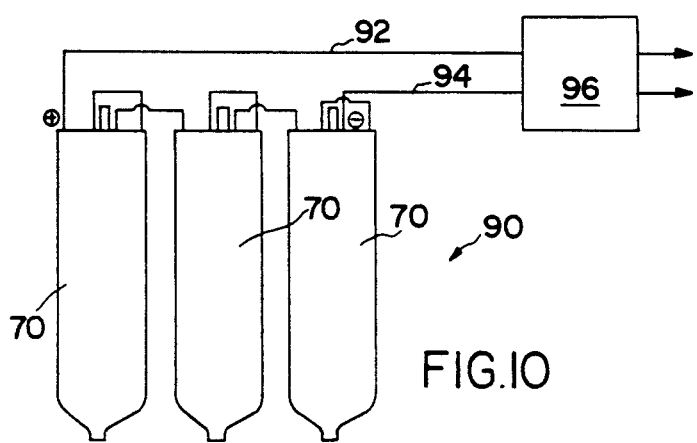
FIG. 10 is a schematic view of a battery assembly comprised of a plurality of collapsible battery assemblies.

A battery assembly, generally indicated as 90, referring now to FIG. 10, is formed of a plurality of the battery assemblies 70 electrical configured in series relationship therebetween and by conductors 92 and 94 to a power regulator 96. The power regulator 96 may be a AC/DC converter capable of changing the input of the battery assembly 90 to operationally required voltage and current.

The following examples are intended to more fully illustrate the present invention without limiting on its scope.

EXAMPLE I

From an 8"×11" film of vinyl plastic of a thickness of 5 mils, there is excised a 3"×5" area intermediate the sides thereof. An air electrode film (4"×6") is glued to the side of the vinyl plastic film to cover the excised portion with the hydrophobic component of the layer being juxtaposed to the opening formed by the excised portion. The air electrode is attached to a electronegative layer, via an intermediate dielectric layer or spacer. A second 8"×11" film of vinyl plastic is heat sealed about the side and bottom edges (about ¼") from the ends to the film including the air cathode with the electronegative layer disposed within the chamber formed by the single sheets.

An electrolyte, such as salt water is introduced into the chamber to a height of 10", with the electronegative layer and current collecting component of the air cathode film being connected by conductors to user equipment to generate 1 ampere at 1 volt.

EXAMPLE II

Two cells are assembled as described in Example 1. The air cathode sides of each of the cells are attached to a porous plate or a frame such that a free air passage is provided for the air cathode of each of the cells. In this arrangement the two cells are collapsible by means of the flexibility of the unattached side of the vinyl bags. The two cells are connected in series to provide 3.0 V on open circuit and 1 amperes at 2.0. Several set of these twin cells are attached in similar manner to increase the battery voltage. A six cell battery is capable of 9.0 V open circuit and 1 amperes at 6 volts.

While the invention has been described in connection with exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A collapsible electrochemical cell, which comprises:
   a first flexible side wall member affixed to a second side wall member forming an expandable chamber for an electrolyte, one of said side walls formed with an air cathode mounted by a dielectric spacer to an electronegative member, said electronegative member being disposed within said chamber, said air cathode member having a hydrophobic layer facing outwardly from said electrochemical cell.

2. The collapsible electrochemical cell as defined in claim 1 whereas said second side wall is formed of a flexible material.

3. The collapsible electrochemical cell as defined in claim 1 wherein said second side wall is an air cathode film.

4. The collapsible electrochemical cell as defined in claim 1 wherein said side walls are air cathode films.

5. The collapsible electrochemical cell as defined in claim 4 wherein said side walls are affixed to each other about peripheral side and bottom edges thereof.

6. The collapsible electrochemical cell as defined in claim 5 wherein said side walls are affixed by adhesive bonding techniques.

7. A battery assembly which comprises a plurality of collapsible electrochemical cells comprising a first flexible side wall member affixed to a second side wall member forming an expandable chamber for an electrolyte, one of said side walls formed with an air cathode mounted by a dielectric spacer to an electronegative member, said electronegative member being disposed within said chamber, said air cathode member having a hydrophobic layer facing outwardly from said electrochemical cell to rigid arm members affixed to side walls of adjacent electrochemical cells for supporting said adjacent electrochemical cells in spaced apart relationship.

8. The battery assembly as defined in claim 7 wherein said second side wall of each electrochemical cell is formed of a flexible material.

9. The battery assembly as defined in claim 7 wherein said second side wall of each of said electrochemical cells is an air cathode film.

10. The battery assembly as defined in claim 7 wherein said side walls of each electrochemical cell is an air cathode film.

11. An electrochemical battery, which comprises:
a dielectric plate member having a plurality of orifices formed therein;
flexible air cathode side walls mounted to said dielectric plate member and forming electrolyte chambers therebetween, a hydrophobic layer of said air cathode film being disposed on a side of said air cathode opposite said chambers; and
an anode plate member mounted to each side of said dielectric plate member.

12. The electrochemical battery as defined in claim 11 wherein said side walls are affixed to said dielectric plate member about side and bottom edges hereof.

13. The electrochemical battery as defined in claim 12 wherein said side walls are affixed by adhesive bonding technique.

14. The electrochemical battery as defined in claim 11 wherein said anode plate members are formed of a material selected from the group consisting of aluminum, magnesium and mixtures hereof.

* * * * *